US010624023B2

(12) United States Patent
Kahtava et al.

(10) Patent No.: US 10,624,023 B2
(45) Date of Patent: Apr. 14, 2020

(54) TELECOMMUNICATIONS APPARATUS AND METHODS FOR ROUTING OF D2D TRAFFIC

(71) Applicant: SONY CORPORATION, Tokyo (JP)

(72) Inventors: Jussi Tapani Kahtava, Basingstoke (GB); Hideji Wakabayashi, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 82 days.

(21) Appl. No.: 15/751,978

(22) PCT Filed: Sep. 22, 2016

(86) PCT No.: PCT/EP2016/072507
§ 371 (c)(1),
(2) Date: Feb. 12, 2018

(87) PCT Pub. No.: WO2017/050869
PCT Pub. Date: Mar. 30, 2017

(65) Prior Publication Data
US 2018/0234913 A1    Aug. 16, 2018

(30) Foreign Application Priority Data
Sep. 24, 2015 (EP) .................................. 15186736

(51) Int. Cl.
*H04W 48/16* (2009.01)
*H04W 36/00* (2009.01)
(Continued)

(52) U.S. Cl.
CPC ........... *H04W 48/16* (2013.01); *H04W 8/005* (2013.01); *H04W 36/0069* (2018.08);
(Continued)

(58) Field of Classification Search
CPC . H04W 48/16; H04W 36/0069; H04W 8/005; H04W 36/30; H04W 16/26; H04W 76/14
See application file for complete search history.

(56) References Cited

U.S. PATENT DOCUMENTS

2004/0116111 A1* 6/2004 Saunders .............. H04W 16/18
455/423
2010/0020725 A1* 1/2010 Ha ........................ H04W 48/16
370/255
(Continued)

FOREIGN PATENT DOCUMENTS

WO    2014/129356 A1    8/2014
WO    2014/198325 A1    12/2014
(Continued)

OTHER PUBLICATIONS

International Search Report dated Feb. 3, 2017 in PCT/EP2016/072507 filed Sep. 22, 2016.
(Continued)

*Primary Examiner* — Moo Jeong
(74) *Attorney, Agent, or Firm* — Xsensus LLP

(57) ABSTRACT

A method of routing communication in a mobile communications system, including a first of mobile communications devices operable to communicate via a wireless interface by routing downlink and/or uplink traffic to a base station and by routing device-to-device traffic directly via a sidelink to at least one other of mobile communications devices. The method includes: estimating, using sidelink discovery reporting information from a second mobile communications device, that the sidelink between the first and second mobile communications devices is experiencing shadowing caused by one or more obstacles; upon estimating that the sidelink between the first and second mobile communications devices is experiencing shadowing, instructing the first and second mobile communications
(Continued)

devices to communicate via the base station for at least part of the device-to-device traffic for the first mobile communications device.

17 Claims, 5 Drawing Sheets

(51) Int. Cl.
*H04W 8/00* (2009.01)
*H04W 36/30* (2009.01)
*H04W 16/26* (2009.01)
*H04W 76/14* (2018.01)

(52) U.S. Cl.
CPC ............ *H04W 36/30* (2013.01); *H04W 16/26* (2013.01); *H04W 76/14* (2018.02)

(56) References Cited

U.S. PATENT DOCUMENTS

| 2010/0279672 | A1 | 11/2010 | Koskela et al. |
| 2012/0150386 | A1 | 6/2012 | Armbrust |
| 2015/0105085 | A1* | 4/2015 | Tseng .................... H04W 36/04 455/444 |
| 2015/0245193 | A1 | 8/2015 | Xiong et al. |
| 2016/0007259 | A1 | 1/2016 | Fukuta |
| 2016/0037322 | A1* | 2/2016 | Nguyen ................ H04W 76/14 370/329 |
| 2016/0242152 | A1 | 8/2016 | Yu et al. |
| 2016/0295525 | A1* | 10/2016 | Zhu ...................... H04B 7/0617 |

FOREIGN PATENT DOCUMENTS

| WO | 2015/062671 A1 | 5/2015 |
| WO | 2015/126567 A1 | 8/2015 |

OTHER PUBLICATIONS

Harri Holma et al., "LTE for UMTS, OFDMA and SC-FDMA Based Radio Access", John Wiley and Sons, 2009, 4 total pages.

"Advancing map-enhanced driver assistance systems", http://adasis.org, obtained Jan. 24, 2018, 1 total page.

* cited by examiner

TELECOMMUNICATIONS APPARATUS AND METHODS FOR ROUTING OF D2D TRAFFIC

CROSS-REFERENCE TO RELATED APPLICATIONS

The present application is based on PCT filing PCT/EP2016/072507 filed Sep. 22, 2016, and claims priority to European Patent Application 15 186 736.3, filed in the European Patent Office on Sep. 24, 2015, the entire contents of each of which being incorporated herein by reference.

FIELD

The present disclosure relates to telecommunications apparatus and methods.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Mobile telecommunication systems, such as those based on the 3GPP defined UMTS and Long Term Evolution (LTE) and Long Term Evolution Advanced (LTE-A) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as video streaming and video conferencing on mobile communications devices that would previously only have been available via a fixed line data connection.

The demand to deploy fourth generation networks is therefore strong and the coverage area of these networks, i.e. geographic locations where access to the networks is possible, is expected to increase rapidly. However, although the coverage and capacity of fourth generation networks is expected to significantly exceed those of previous generations of communications networks, there are still limitations on network capacity and the geographical areas that can be served by such networks. These limitations may, for example, be particularly relevant in situations in which there is a desire for a group of terminal devices (communications devices) to exchange information with each other in a fast and reliable manner. In order to help address these limitations there have been proposed approaches in which terminal devices within a wireless telecommunications system may be configured to communicate data directly with one another without some or all their communications passing through an infrastructure equipment element, such as a base station. Such communications are commonly referred to generally as a device-to-device (D2D) communications. Many device-to-device communications may be transmitted by one device to a plurality of other devices in a broadcast like manner and so in that sense the phrase "device-to-device communications" also covers "device-to-devices communications".

Thus, D2D communications allow communications devices that are in sufficiently close proximity to directly communicate with each other, both when within the coverage area of a network and when outside a network's coverage area (e.g. due to geographic restrictions on a network's extent or because the network has failed or is in effect unavailable to a terminal device because the network is overloaded). D2D communications can allow user data to be more efficiently and quickly communicated between communications devices by obviating the need for user data to be relayed by a network entity such as a base station. D2D communications also allow communications devices to communicate with one another even when one or both devices may not be within the reliable coverage area of a network. The ability for communications devices to operate both inside and outside of coverage areas makes wireless telecommunications systems that incorporate D2D capabilities well suited to applications such as public protection/safety and disaster relief (PPDR), for example. PPDR related communications may benefit from a high degree of robustness whereby devices can continue to communicate with one another in congested networks and when outside a coverage area. 3GPP has developed some proposals for such public safety D2D use in LTE networks in Release12.

The automotive industry has been working for several years on solutions to enable communication with and between vehicles, e.g. to help improve traffic flow and safety. These techniques can range from automatic tolling technologies to collision prevention mechanisms, and are generally known as Intelligent Transport Systems (ITS). Currently, the main radio technology under consideration in standards projects relating to ITS is a WLAN derivative 802.11p, which would be used for broadcasting ITS information by vehicles or road side infrastructure to other vehicles. This constitutes so-called Dedicated Short Range Communication (DSRC) system that is deployed at 5.9 GHz ITS band in Europe and North America (there may be different ITS bands in use in other regions, e.g. 700 MHz in Japan).

The effective range of DSRC systems is a few hundred meters and the services are broadcast oriented (emergency vehicle notices, for example).

However, there have also been proposals for communications based on those used in mobile telecommunications systems, such as Long Term Evolution (LTE) based networks operating on International Mobile Telecommunications (IMT) bands, to help support ITS applications, for example to provide more capacity and potentially provide for wider and cheaper coverage. In particular, where the existing cellular network already covers roadways the capital expenditure costs associated with using cellular mobile telecommunications techniques for ITS applications may be significantly less than what would be needed for setting up a new DSRC-based ITS network.

Accordingly, an Intelligent Transport System may rely on D2D communications of the kind proposed for mobile wireless telecommunications systems to allow vehicles to communicate with one another and with other terminal devices or network infrastructure equipment, such as a base station or specific road side infrastructure. In this regard, communications associated with connected vehicle systems may be conveniently referred to as V2X (vehicle-to-everything) communications, which may comprise V2V (vehicle-to-vehicle), V2P (vehicle-to-pedestrian) and V2I (vehicle-to-infrastructure). Infrastructure in this case may be a roadside ITS related infrastructure element, which may be referred to as a road side unit (RSU), or a conventional Internet or mobile network infrastructure element. Some examples or services in connected a vehicle context are Cooperative Awareness Message (CAM) and Decentralised Environmental Notification (DEN). These constitute applications such as allowing emergency vehicles to broadcast their presence and allowing roadside infrastructure to broadcast speed limit information to vehicles.

It has been proposed that V2X communications may be implemented using dedicated Road Side Units (RSUs) which communicate with vehicles and which assign radio resources for use by the vehicles in V2X communications. In particular, such RSUs may allocate D2D radio resources for use in V2X communications. Nonetheless, it is also to be expected that there may be situations where vehicles will wish to autonomously communicate directly with one another (V2V) without any network infrastructure interaction, for example because not all the roadways may have RSUs installed, particularly in more rural areas. V2X or V2X-like communications between vehicle can however have the combined specificity that the communicating terminals may each be at a fairly low elevation (for example about 1.5 m) and that the communications may be related to safety and therefore critical and/or high priority. Due to the low height or elevation, it can be difficult to achieve line of sight ("LOS") conditions between the terminals because of obstacles around the terminals and, as a result, the terminals may not be able to communicate with each other or maybe not until a later point in time. This aspect combined with the potentially high priority or the critical level of the V2X communications can result in high safety risk. Arrangements which are able to consider obstacles can thus assist with a suitable flow of traffic between terminals and with promoting safety in a V2X environment.

SUMMARY

According to a first example aspect, there is provided a method of routing communication in a mobile communications system, the mobile communications system comprising a base station configured to communicate with mobile communications devices via a wireless interface, wherein a first of the mobile communications devices is operable to communicate via the wireless interface by routing downlink and/or uplink traffic to the base station and by routing device-to-device traffic directly via a sidelink to at least one other of the mobile communications devices. The method comprises: estimating, using sidelink discovery reporting information from a second mobile communications device, that the sidelink between the first and second mobile communications devices is experiencing shadowing caused by one or more obstacles; and upon estimating that the sidelink between the first and second mobile communications devices is experiencing shadowing, instructing the first and second mobile communications devices to communicate via the base station for at least part of the device-to-device traffic for the first mobile communications device.

According to a second example aspect, there is provided a method of operating a mobile communications device in a mobile communications system, the mobile communications system comprising a base station configured to communicate with the mobile communications device via a wireless interface, wherein the mobile communications device is operable to communicate via the wireless interface by routing downlink and/or uplink traffic to the base station and by routing device-to-device traffic directly via a sidelink to at least one other of the mobile communications devices. The method comprises the mobile communications device: performing a sidelink discovery process for discovering one or more mobile communications devices with activated transportation-related functionalities; upon detection that the number of discovered mobile communications devices is under an expected number, transmitting sidelink discovery reporting information based on the sidelink discovery process performed; upon receipt of re-routing instructions from the base station, routing at least part of device-to-device traffic via the base station.

According to a third example aspect, there is provided a mobile communications device in a mobile communications system, the mobile communications system comprising a base station configured to communicate with the mobile communications device via a wireless interface, wherein the mobile communications device comprises a transmitter, receiver and controller configured to operate together to communicate via the wireless interface by routing downlink and/or uplink traffic to the base station and by routing device-to-device traffic directly via a sidelink to at least one other of the mobile communications devices. The transmitter, receiver and controller are further configured to operate together to: perform a sidelink discovery process for discovering one or more mobile communications devices with activated transportation-related functionalities; upon detection that the number of discovered mobile communications devices is under an expected number, transmit sidelink discovery reporting information based on the sidelink discovery process performed; upon receipt of re-routing instructions from the base station, route at least part of device-to-device traffic via the base station.

According to a fourth example aspect, there is provided integrated circuitry for a mobile communications device in a mobile communications system, the mobile communications system comprising a base station configured to communicate with the mobile communications device via a wireless interface, wherein the mobile communications device comprises a transmitter, receiver and controller configured to operate together to communicate via the wireless interface by routing downlink and/or uplink traffic to the base station and by routing device-to-device traffic directly via a sidelink to at least one other of the mobile communications devices. The integrated circuitry comprises a controller element and a transceiver element configured to operate together to: perform a sidelink discovery process for discovering one or more mobile communications devices with activated transportation-related functionalities; upon detection that the number of discovered mobile communications devices is under an expected number, transmit sidelink discovery reporting information based on the sidelink discovery process performed; and upon receipt of re-routing instructions from the base station, route at least part of device-to-device traffic via the base station.

According to a fifth example aspect, there is provided a method of operating a network device in a mobile communications system, the mobile communications system comprising a base station configured to communicate with mobile communications devices via a wireless interface, wherein a first of the mobile communications devices is operable to communicate via the wireless interface by routing downlink and/or uplink traffic to the base station and by routing device-to-device traffic directly via a sidelink to at least one other of the mobile communications devices. The method comprises the network device: estimating, using sidelink discovery reporting information from one or more mobile communications devices, that the sidelink between the first and second mobile communications devices is experiencing shadowing caused by one or more obstacles; and upon estimating that the sidelink between the first and second mobile communications devices is experiencing shadowing, instructing the first mobile communications device to communicate via the base station for at least part of device-to-device traffic.

According to a sixth example aspect, there is provided a network device in a mobile communications system, the mobile communications system comprising a base station configured to communicate with mobile communications devices via a wireless interface, wherein a first of the mobile communications devices is operable to communicate via the wireless interface by routing downlink and/or uplink traffic to the base station and by routing device-to-device traffic directly via sidelink to at least one other of the mobile communications devices. The network device is configured to: estimate, using sidelink discovery reporting information from one or more mobile communications devices, that the sidelink between the first and second mobile communications devices is experiencing shadowing caused by one or more obstacles; and upon estimating that the sidelink between the first and second mobile communications devices is experiencing shadowing, instruct the first mobile communications device to communicate via the base station for at least part of device-to-device traffic. The network device may be part of -or be- at least one of: a base station, a road-side unit, a relay node and any other piece of network equipment.

According to a seventh example aspect, there is provided integrated circuitry for network device in a mobile communications system, the mobile communications system comprising a base station configured to communicate with mobile communications devices via a wireless interface, wherein a first of the mobile communications devices is operable to communicate via the wireless interface by routing downlink and/or uplink traffic to the base station and by routing device-to-device traffic directly via sidelink to at least one other of the mobile communications devices. The integrated circuitry comprises a controller element and, optionally, a transceiver element configured to operate together to: estimate, using sidelink discovery reporting information from one or more mobile communications devices, that the sidelink between the first and second mobile communications devices is experiencing shadowing caused by one or more obstacles; and upon estimating that the sidelink between the first and second mobile communications devices is experiencing shadowing, instruct the first mobile communications device to communicate via the base station for at least part of device-to-device traffic.

According to an eighth example aspect, there is provided computer software which, when executed by a computer, causes the computer to perform any of the example method discussed above. According to a ninth example aspect, there is provided a storage medium which stores the computer software.

Further respective aspects and features are defined by the appended claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
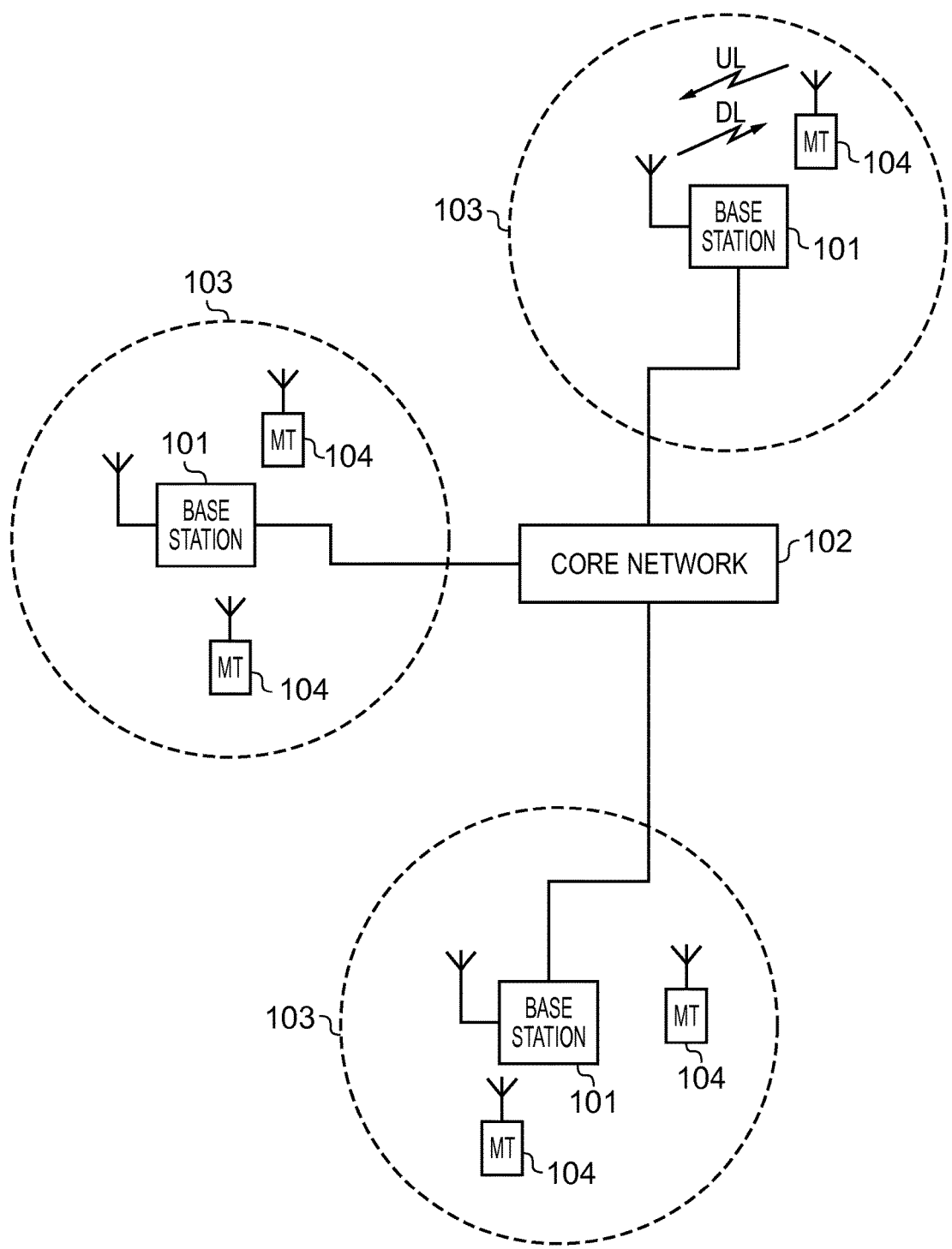
FIG. 1 provides a schematic diagram illustrating an example of a mobile telecommunication system.

FIG. 1 provides a schematic diagram illustrating some basic functionality of a mobile (cellular) telecommunications network/system 100, in this example operating generally in accordance with LTE principles, and which may be adapted to implement embodiments of the disclosure as described further below. Various elements of FIG. 1 and their respective modes of operation are well-known and defined in the relevant standards administered by the 3GPP (RTM) body, and also described in many books on the subject, for example, Holma, H. and Toskala, A. [1]. It will be appreciated that operational aspects of the telecommunications network which are not specifically described below may be implemented in accordance with any known techniques, for example according to the relevant standards and known variations thereof. Furthermore, it will be appreciated that whilst some specific examples described herein may refer to implementations based around particular 3GPP implementations, the same principles can be applied regardless of the underlying operating principles of the network. That is to say, the same principles can be applied for wireless telecommunications networks operating in accordance with other standards, whether past, current or yet to be specified.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The uplink and downlink communications are made using radio resources that may be used by the operator of the network 100. The core network 102 routes data to and from the terminal devices 104 via the respective base stations 101 and provides functions such as authentication, mobility management, charging and so on. In addition to the base stations 101 and terminal devices 104, the system 100 further comprises one or more relay nodes/devices 105. These may be used to enhance coverage for terminal devices operating in the relevant cell(s). The deployment of relay nodes (e.g. in terms of their locations) may follow generally established techniques for using relay nodes to support coverage in wireless telecommunications systems. In terms of terminology, it will be appreciated that terminal devices may also be referred to as mobile stations, user equipment (UE), user terminal, mobile radio, and so forth. Similarly, base stations may also be referred to as transceiver stations/nodeBs/e-nodeBs, and so forth. Furthermore, relay nodes may also be referred to as relay devices/relays, and so forth. In some example implementations of the present disclosure, a terminal device may be operating as a relay node to assist in supporting communications associated with other terminal devices. That is to say, the functionality of a relay device may be provided by a suitably configured terminal device.

Mobile telecommunications systems such as those arranged in accordance with the 3GPP defined Long Term Evolution (LTE) architecture use an orthogonal frequency division multiplex (OFDM) based interface for the radio downlink (so-called OFDMA) and the radio uplink (so-called SC-FDMA).

Figure 2:
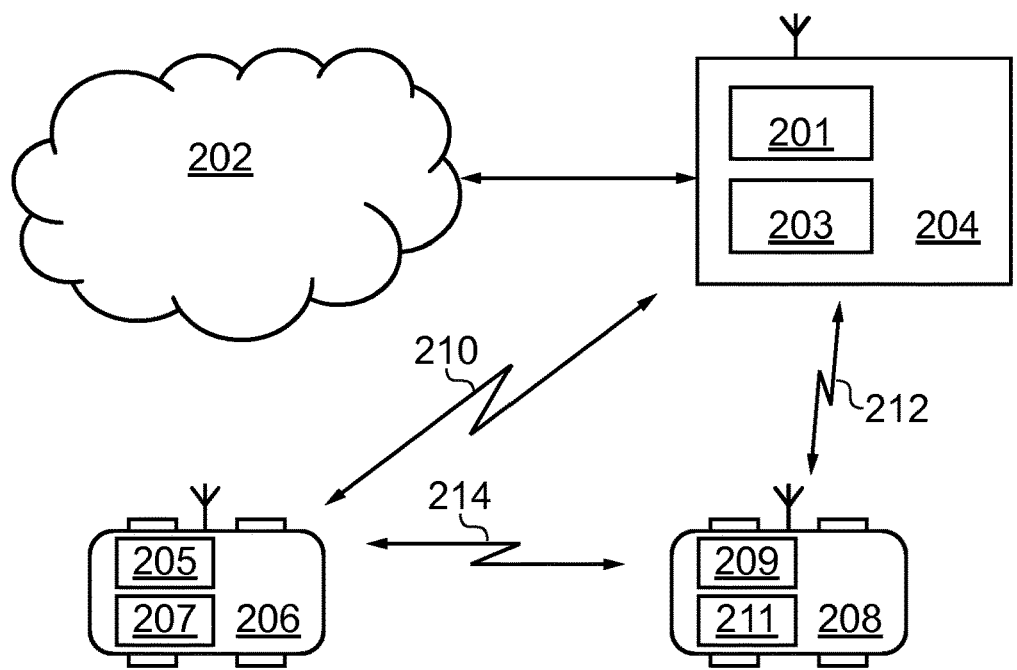
FIG. 2 schematically represents a wireless telecommunications system according to certain embodiments of the disclosure.

FIG. 2 schematically shows a telecommunications system 200 according to an embodiment of the disclosure. In particular, FIG. 2 represents an operating scenario in the context of an Intelligent Transport System (ITS) scheme whereby vehicles equipped with terminal devices are configured to support device-to-device communications (vehicle-to-vehicle communications) to allow them to communicate with one another to exchange information using the radio resources of the wireless telecommunications system 200. The telecommunications system 200 in this example is based broadly on an LTE-type architecture with modifications to support device-to-device communications (i.e. direct signalling exchange between terminal devices to communicate data between them) generally in accordance with previously proposed schemes for D2D communications. As such many aspects of the operation of the telecommunications system 200 are already known and understood and not described here in detail in the interest of brevity. Operational aspects of the telecommunications system 200 which are not specifically described herein may be implemented in accordance with any known techniques, for example according to the established LTE-standards and known variations and modifications thereof (e.g. to provide/introduce support for D2D communications in a vehicle-to-vehicle/ITS context).

It will be appreciated the information content of the communications between the vehicles is not significant to the principles underlying the operations described herein. Thus in any given case the information content will depend on the implementation at hand and the functionality the particular ITS scheme provides. For example, in some implementations the information exchanged through the vehicle-to-vehicle communications may comprise information regarding the speed and direction of the respective vehicles and relevant operating characteristics, such as whether the vehicle brakes are being applied and whether the vehicle is indicating an intention to turn/change direction.

The telecommunications system 200 comprises a core network part (evolved packet core) 202 coupled to a radio network part. The radio network part comprises a base station (evolved-nodeB) 204, a first terminal device 206 and a second terminal device 208. Each terminal device is deployed within a vehicle for providing vehicle-to-vehicle communication functionality. It will of course be appreciated that in practice the radio network part will comprise a plurality of base stations serving a larger number of terminal devices (vehicles) across various communication cells. However, only a single base station and two terminal devices are shown in FIG. 2 in the interests of simplicity for this figure.

As with a conventional mobile radio network, the terminal devices 206, 208 are arranged to communicate data to and from the base station (transceiver station) 204. The base station is in turn communicatively connected to a serving gateway, S-GW, (not shown) in the core network part which is arranged to perform routing and management of mobile communications services to the terminal devices in the telecommunications system 200 via the base station 204. In order to maintain mobility management and connectivity, the core network part 202 also includes a mobility management entity (not shown) which manages the enhanced packet service, EPS, connections with the terminal devices 206, 208 operating in the communications system based on subscriber information stored in a home subscriber server, HSS. Other network components in the core network (also not shown for simplicity) include a policy charging and resource function, PCRF, and a packet data network gateway, PDN-GW, which provides a connection from the core network part 202 to an external packet data network, for example the Internet. As noted above, the operation of the various elements of the communications system 200 shown in FIG. 2 may be broadly conventional apart from where modified to provide functionality in accordance with embodiments of the disclosure as discussed herein. It will further be appreciated that for other implementations which are based around wireless telecommunications systems operating in accordance with different standards, the network architecture may be correspondingly different.

The first and second terminal devices 206, 208 are D2D (more specifically, V2V) enabled devices configured to operate in accordance with embodiments of the present disclosure as described herein. The terminal devices 206, 208 each comprise a respective transceiver unit 205, 209 for transmission and reception of wireless signals and a respective controller unit 207, 211 configured to control the respective terminal devices 206, 208. The respective controller units 207, 211 may each comprise a processor unit which is suitably configured/programmed to provide the desired functionality using conventional programming/configuration techniques for equipment in wireless telecommunications systems. The respective transceiver units 205, 209 and controller units 207, 211 are schematically shown in FIG. 2 as separate elements. However, it will be appreciated for each of the terminal devices the functionality of the terminal device's receiver and controller units can be provided in various different ways, for example using a single suitably programmed general purpose computer, or suitably configured application-specific integrated circuit(s)/circuitry. It will be appreciated the first and second terminal devices 206, 208 will in general comprise various other elements associated with their operating functionality in accordance with established wireless telecommunications techniques (e.g. a power source, possibly a user interface, and so forth).

The base station 204 is configured to support communications with the terminal devices and may also in some situations for some examples play a role in configuring aspects of D2D communications between the terminal devices, for example establishing which radio resources may be used for D2D communications between terminal devices operating within the coverage area of the base station 204. The base station 204 comprises a transceiver unit 201 for transmission and reception of wireless signals and a controller unit 203 configured to control the base station 204. The controller unit 203 may comprise a processor unit which is suitably configured/programmed to provide the desired functionality using conventional programming/configuration techniques for equipment in wireless telecommunications systems. The transceiver unit 201 and the controller unit 203 are schematically shown in FIG. 2 as separate elements for ease of representation. However, it will be appreciated that the functionality of these units can be provided in various different ways, for example using a single suitably programmed general purpose computer, or suitably configured application-specific integrated circuit(s)/circuitry or using a plurality of discrete circuitry/processing elements for providing different elements of the desired functionality. It will be appreciated the base station 204 will in general comprise various other elements associated with its operating functionality. For example, the base station 204 will in general comprise a scheduling entity responsible for scheduling communications. The functionality of the scheduling entity may, for example, be subsumed by the controller unit 203.

Thus, the base station 204 is configured to communicate data with the first terminal device 206 over a first radio communication link 210 and communicate data with the second terminal device 208 over a second radio communication link 212. Both radio links may be supported within a single radio frame structure associated with the base station 204. It is assumed here the base station 204 is configured to communicate with the terminal devices 206, 208 over the respective radio communication links 210, 212 generally in accordance with the established principles of LTE-based communications. Nevertheless, it will be appreciated that some embodiments may be implemented without the respective terminal devices undertaking any base station communications, and in this regard the principles and some aspects described herein with regards to vehicle-to-vehicle communications may for some implementations be undertaken regardless of whether the respective vehicles (mobile terminals) are in coverage or out of coverage of a base station. Although the links 210, 212 have been illustrated as single bi-directional links, they can comprise or consist of an uplink and/or a downlink as commonly known to the skilled person.

In addition to the terminal devices 206, 208 being arranged to communicate data to and from the base station (transceiver station) 204 over the respective first and second radio communication links 210, 212, the terminal devices 206, 208 are further arranged to communicate with one another (and other terminal devices within the wireless telecommunications system) in a device-to-device (D2D) manner over a D2D radio communication link 214, as schematically indicated in the figure. A direct communication link between two devices can sometimes be referred to a sidelink, which can be used to carry sidelink traffic such as D2D traffic. The underlying principles of the D2D communications supported in the wireless telecommunications system of FIG. 2 may follow any previously proposed techniques, but with modifications to support approaches in accordance with embodiments of the disclosure as described herein.

Figure 3:
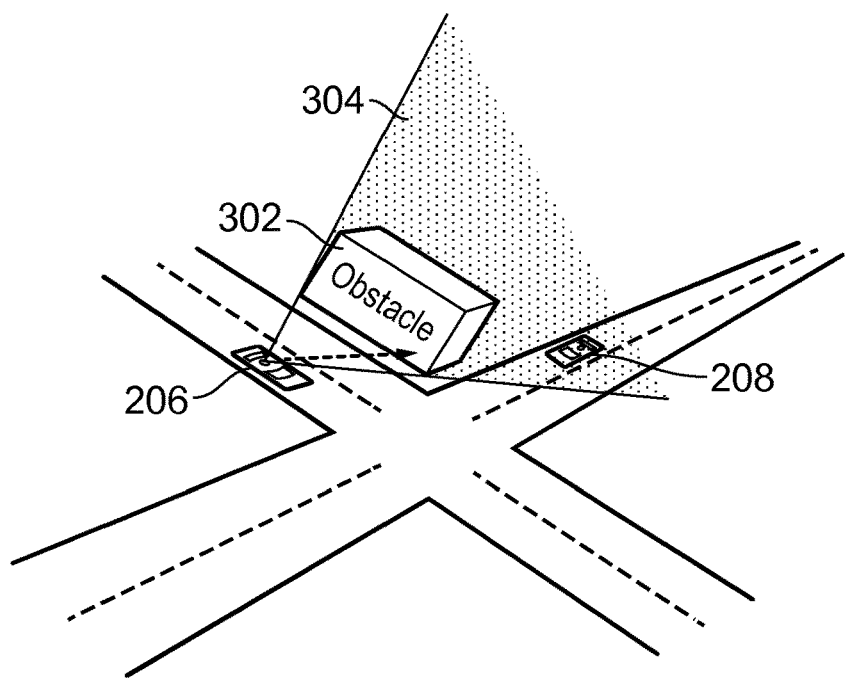
FIG. 3 schematically represents how obstacles can affect sidelink traffic.

FIG. 3 schematically represents how obstacles can affect sidelink traffic. Vehicles 206 and 208 are travelling on their respective roads and an obstacle 302 stands on the line of sight between vehicles 206, 208. The obstacle 302 can for example be a building, a tree, a hill, another type of natural feature, a group of people, a bus, etc. and it obscures the main signal path, creating a shadowed zone 304 in which other terminals cannot have direct line of sight conditions with vehicle 206. Although not represented on FIG. 3, obstacle 302 will create a corresponding shadowed zone for vehicle 208 where the main signal path is faded. Generally, an obstacle will cause slow fading in the radio channel through shadowing around where vehicles or terminals will lose line of sight condition to some other vehicles or terminals. This can therefore disrupt the sidelink traffic between terminals. It is noteworthy that an obstacle is unlikely to affect uplink or downlink traffic in the same manner as sidelink traffic because of the differences in elevation: a base station is more likely to be located above the obstacle such that the obstacle is less likely to be obstructing communications between a terminal and a base station compared to terminal-to-terminal communications.

In Non-line-of-sight (NLOS) or near-line-of-sight conditions, multipath propagation can sometimes be used to compensate for the obstruction. However, the higher the carrier frequency is, the less benefit multipath propagation will have. The ITS band of 5.9 GHz in particular requires LOS conditions to provide reasonable quality of communication between two end points. This obstruction of radio signals can thus cause considerable challenges in trying to ensure that the use cases envisioned for ITS may actually be supported in a real-life environment.

WO 2014/198325 [2] entitled "Controlling vehicle-to-vehicle communication using a distribution scheme" discusses an arrangement in which two different radio technologies are used for V2V communication (802.11p and cellular connection). Document [2] discusses a distribution scheme set by the network for distributing data using either technology. The distribution scheme is set according to the coverage area of the respective radio technologies, their respective throughputs and transmission capabilities. However, such a distribution scheme fails to contemplate, let alone address, how to consider obstructions and poor transmission performances resulting from obstructions.

Figure 4:
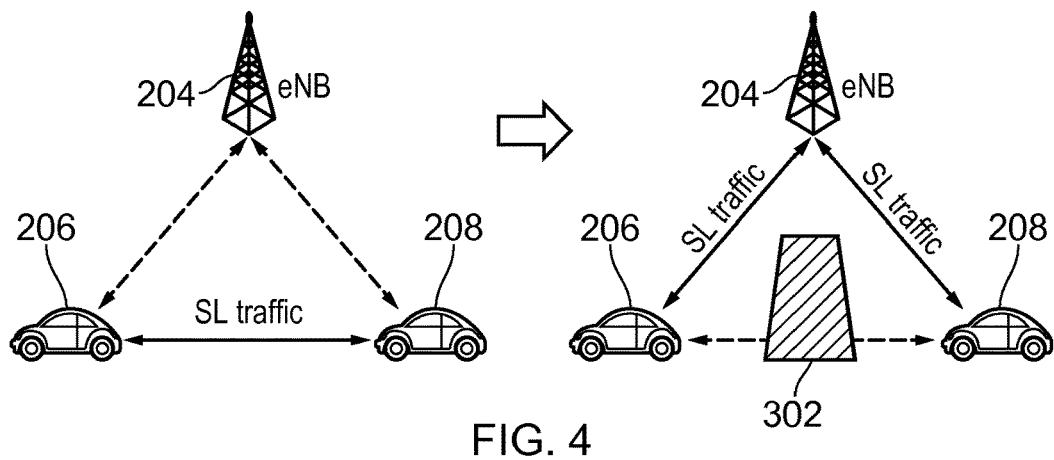
FIG. 4 schematically represents an example of obstructions avoidance.

FIG. 4 schematically represents an example of obstructions avoidance. In this example, two vehicles 206 and 208 communicate via a wireless interface and can communicate directly using the sidelink (SL) for SL traffic and with the base station 204 (if within range) for conventional UL and/or DL traffic. In situations where the base station 204 is within range and where an obstacle 302 is obstructing the sidelink between vehicles 206 and 208, the obstruction is detected and device-to-device (D2D) traffic is redirected from the SL to the base station via the downlinks and uplinks between the base station 204 and the terminals 206, 208. Accordingly, using obstruction and/or obstacle detection, the D2D traffic can be dynamically redirected via the base station when need be, on a case-by-case basis. Several possible examples of obstacle detection are further discussed below wherein, depending on any of the terminals' capabilities, the network's capabilities, the environment, the user's preferences, the operator's preferences, any mobile or V2X standard, etc., one or more of these examples can be selected to suit the need of a particular situation.

Accordingly, when no obstruction is detected, D2D traffic can be routed via the sidelink, as would normally be expected whereas when an obstruction is detected, D2D traffic can be redirected to be routed via the base station with a view to maintaining a communication link between the terminals. It will be clear from the present disclosure that the detection of an obstacle or of an obstruction can be for detecting a likelihood of the presence of an obstacle or obstruction, for example a high likelihood of an obstruction affecting the traffic for one or more terminals and/or in an area or zone.

In a first example, the detection of an obstruction can be initiated by a terminal. In a V2X environment, the terminals are generally located in well-defined parts of the geography, for example roads, car parks etc. and, conventionally, V2X communications or technologies will be used in a majority of cases when the terminal is on a road. Conventionally, the satellite navigation systems have databases that hold information on all the roads that a vehicle may traverse and they also contain information on the roads or road features (e.g. bridge, tunnel, turn, etc.) that are in the vicinity. In this field, the "ADASIS Forum" has been working on developing a standardised model to represent satnav device map data, and an information exchange interface between a satnav device and other vehicular systems. This standardised data model can assist in representing the satnav map data ahead of the vehicle which is called 'ADAS Horizon'. The ADAS Horizon has information on the curvature of the traversed road, intersections, nearby other roads and anything that is included in the satnav database regarding the map. Conventionally, this type of map information is used by other vehicular systems or elements, such as for changing a direction of a vehicle's sensor depending on the road's curvature (see for example US 2012/0150386 [3] entitled "Method for operating at least one sensor of a vehicle and driver assistance system for a vehicle"). While this information has conventionally not been used in mobile systems, in accordance with an example of the present disclosure, this information or this type of information may be used by a mobile communications system when trying to detect or estimate whether an obstruction is affecting the traffic for one or more terminals.

Figure 5:
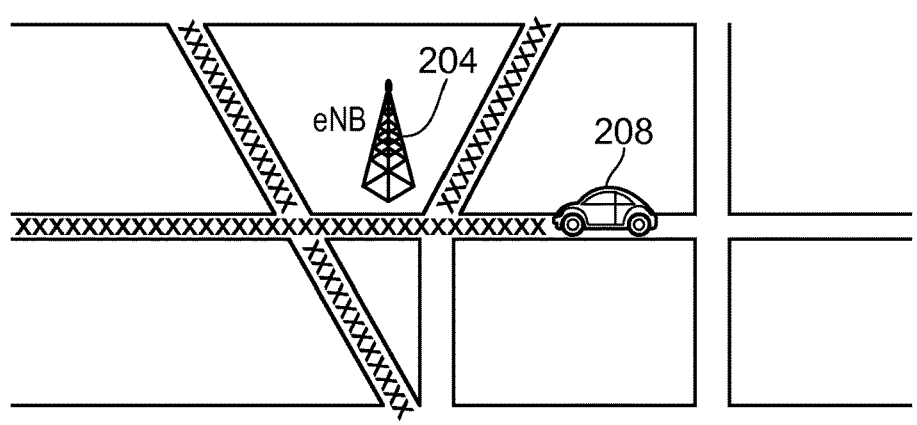
FIG. 5 schematically represents an example of roads that may be relevant for obstruction detection.

FIG. 5 schematically represents an example of roads that may be relevant for obstruction detection. Based on satnav data that may be obtainable by the terminal (of vehicle) 208, the terminal 208 can determine which roads may be relevant from a V2X perspective. These roads have been identified with crosses on FIG. 5. The terminal can for example use information such as road position, road direction, traffic direction (e.g. one-way or two-way), etc. to determine which roads are of relevant to terminal 208.

Accordingly, in one example of the present disclosure, this information may be used to assist with the obstruction avoidance.

Figure 6:
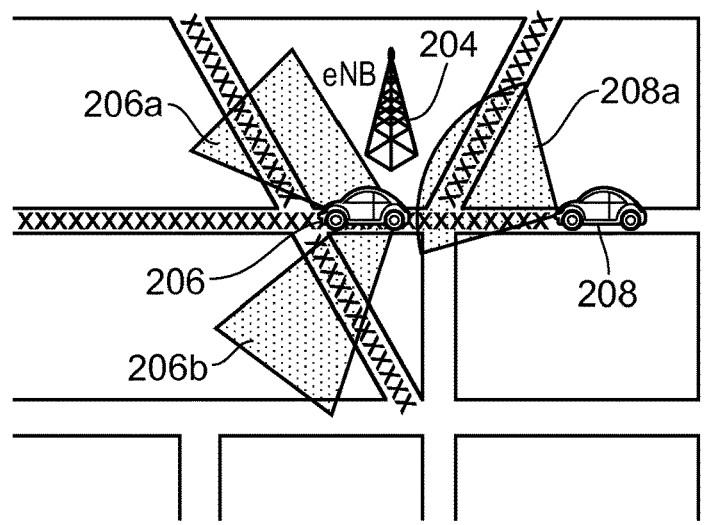
FIG. 6 schematically represents an example obstructions avoidance implementation.

FIG. 6 schematically represents an example obstructions avoidance implementation. For the purposes of describing this example, we consider an example where a V2X-enabled terminal obtains data from a satnav device to retrieve or find information on the roads ahead and around its current position. It is noteworthy that while this satnav information was previously used for determining information on the road on which the vehicle is travelling, a key difference here is that the information to be used by the terminal can comprise (or consist of in some cases) information on other roads that will cross the vehicle's pathway or any other road feature in the vicinity of the vehicle's path or expected path. For example, this map data helps the V2X-enabled terminal to determine, using for example the vehicle's or terminal's direction of travel, whether other roads may intersect the current road, and thus where potential targets for D2D discovery would be located in. Accordingly, a terminal may attempt to discover other D2D terminals, for example other V2X-enabled terminals, when an intersection or another example of road feature is detected and depending on the outcome of the discovery process compared with an expected outcome of the discovery process, it can be estimated whether the terminal is experiencing shadowing, i.e. whether the terminal is likely to have or has a view obstructed by one or more obstacles that prevent it from detecting other V2X terminals in the area. Although intersections are used as the main examples in the examples discussed herein, the skilled person will understand that any other type of road features which is generally associated with a higher safety risk and/or where the terminal may found other terminals to communicate with may be used using the same teachings.

In the example of FIG. 6, the V2X-enabled terminals 206, 208 are equipped with one or more antennas with beam-forming capabilities, directional capabilities and/or any other type of antenna steering capabilities (for example using electrical and/or mechanical functionalities). Looking at terminal 206, once the terminal 206 has acquired the road information related to its horizon, it may direct the antenna towards a direction comprising a road with potentially approaching traffic, as illustrated by the antenna's coverage zones 206a and 206b in FIG. 6 which are directed towards the intersecting roads. Terminal 206 can then attempt to discover other D2D terminals, e.g. by listening for D2D discovery signals in that direction. Terminal 206 may then report its position or any suitable form of geo-localisation information, and optionally the selected road's direction used for the antenna from its position, along with discovery information to the serving base station. The base station or any other network equipment can then evaluate whether the discovery information received from terminal 206 corresponds to what would be expected from this terminal and whether any discrepancies are indicative of terminal 206 suffering from shadowing or obstruction from an obstacle. For example, the network can estimate whether any other D2D terminals was present and/or transmitting in the selected direction and/or on the relevant road, and whether these other D2D terminals have been discovered or detected by the terminal. In one particular example, the terminal can report discovery information to the network when the terminal cannot discover any D2D signals or terminals from the selected direction. In this case, the network can estimate whether the terminal should have been able to see another D2D terminal transmitting on the selected road or in the selected direction and, upon receipt of the discovery report indicating that no D2D terminal was detected, may then detect or estimate that the terminal is experiencing shadowing.

Whether the terminal report discovery information in all cases or only when no other D2D terminals were detected, or in any other implementation, once it has been detected or estimated that the terminal is experiencing shadowing or obstruction, the D2D traffic for this terminal (and in some examples also for any other terminals that may also be assumed to be experiencing shadowing —for example because they have not been discovered by the terminal even though they were in the direction of the antenna) can be routed via the base station with a view to reducing the effect of the obstruction and to increase the chances of D2D terminals being able to communicate despite the (assumed) obstruction.

Likewise, terminal 208 can direct its antenna towards an expected intersection it is about to cross. In the example of FIG. 6, terminal 208 directs the antenna's coverage zone 208a towards the intersection and the two incoming roads and can then attempt to discover other D2D terminals.

Figure 7:
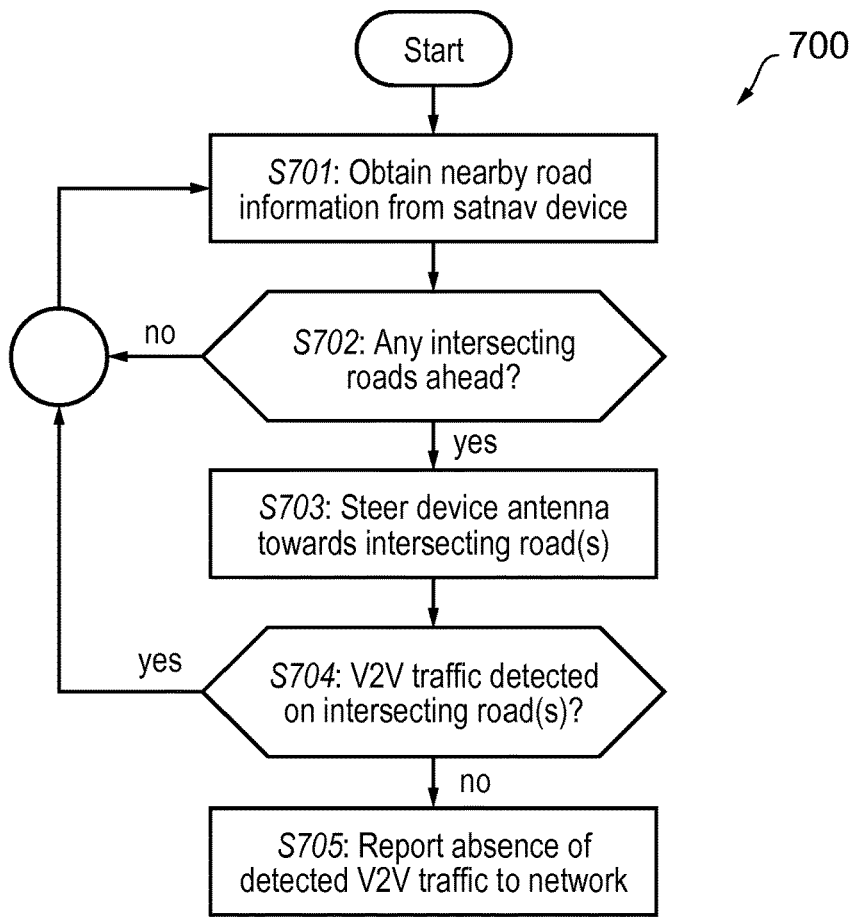
FIG. 7 illustrates an example method for shadowing detection.

FIG. 7 illustrates an example method for shadowing detection. The method 700 can be carried out by a terminal for assisting with shadowing or obstruction detection. Once the method 700 starts, at S701 nearby road information is obtain from a satnav device and, based on the road information, it is determined at S702 whether any intersection roads are expected ahead of the vehicle, or on the vehicle road. If no intersecting roads are expected, the method returns to monitoring the road situation using road information from the satnav device. On the other hand, if one or more intersecting roads are expected ahead, the terminal steers its antenna towards these one or more intersecting roads at S703. Then the terminal attempts to detect V2V (or any other V2X or V2X-like) traffic at S704. In this example, the terminal only reports to the network when no V2V traffic is detected. Therefore the method returns to the monitoring of the roads ahead if V2V traffic is detected at S704. If however the terminal was unable to detect traffic at S704, it then moves on to S705 where it reports to the base station that no V2V traffic was detected at S704. The method can then end or return to the monitoring of the roads ahead. Based on the information reported by the terminal, the network can then attempt to detect whether this terminal, and/or any other terminal, is experiencing shadowing or obstructions.

Figure 8:
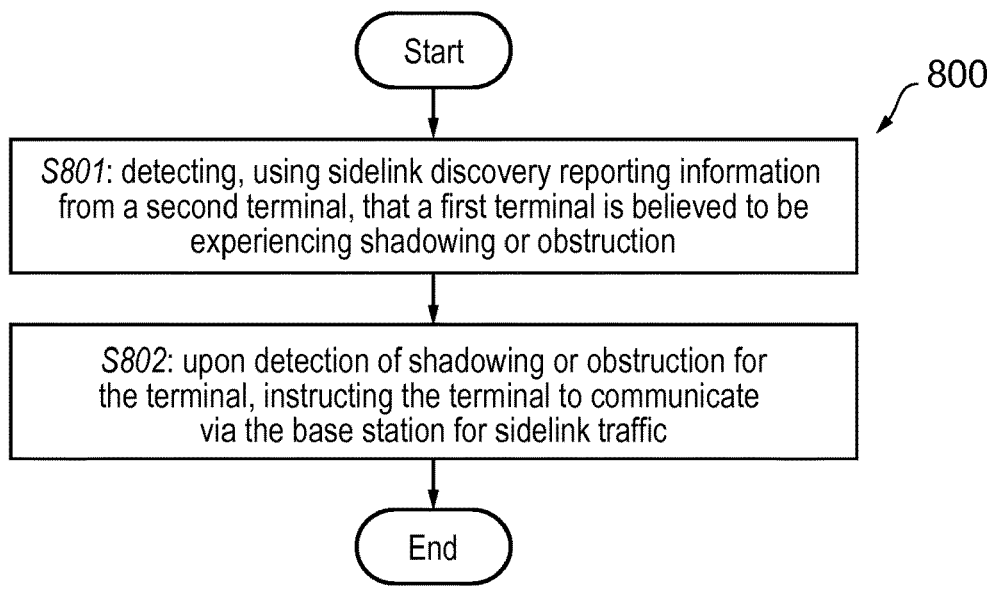
FIG. 8 illustrates another example method for shadowing or obstruction detection.

FIG. 8 illustrates another example method for shadowing or obstruction detection. The method 800 starts and at S801 sidelink discovery reporting information from a second terminal is used to detect that a first terminal is likely to be experiencing shadowing or obstruction. Accordingly, it can be estimated—or detected—that the sidelink between the first and second terminal is affected by an obstruction. In some example, sidelink discovery information from other terminals may also be used for this estimation, for example from the first terminal or from any other appropriate terminal. This can be performed using sidelink reporting information obtained as discussed above, or obtained in any other suitable way, some of which are further discussed below. Then, upon detection of shadowing or obstruction for the terminal, the terminal is instructed at S802 to communicate via the base station for D2D traffic, thereby routing that traffic via the base station, rather than via the expected sidelink (see for example FIG. 4). In some examples, all D2D traffic for the affected terminals can be re-routed via the base station while in other cases, only some or part of the D2D traffic for the affected terminals may be re-routed. For example, in the example of FIG. 8, the instructions to re-route traffic may relate to the D2D traffic between the first and second terminals. If other terminals are also affected by an obstruction for their communications with the first terminal, the D2D traffic between these other terminals and the first terminal may also be re-routed via the base station. Accordingly, it is expected that the effect of obstruction can be reduced while, at the same time, D2D traffic will only be routed via the base station and use resources from the base station when it is believed that the terminal may be affected by shadowing or obstruction caused by an obstacle.

It is also noteworthy that, when a shadowing avoidance scheme such as discussed herein is implemented and implemented by multiple terminals and over a number of time periods, establishing whether the propagation of D2D/V2X signals between two roads or two points is believed to be obstructed can be facilitated. Accordingly, over time, the network can build a dynamic map of where obstructions and shadowing are generally detected. While this would otherwise require the regular use of monitoring terminals surveying an area in an attempt to detect whether the monitoring terminals are experiencing shadowing, the network can now use one or more method as disclosed herein to obtain this information using terminals in use in the network and can also dynamically update the map using incoming sidelink discovery reporting information to reflect any changes without having to survey the area for any possible changes.

Additionally, if an obstruction has already been detected, it can be decided to ask V2X-enabled terminals to communicate D2D traffic via the serving base station when communicating with one or more other V2X-enabled terminals. This can sometimes be determined for terminals in an area that is believed to be affected by an obstruction, or on a terminal-per-terminal basis. For example, even in the presence of obstructions hiding other roadways from view for a first terminal, a second terminal in the proximity of the first terminal and on the same road is unlikely or not believed to be affected by path loss due to obstructions and direct V2V connectivity over the sidelink may be possible and carried out (e.g. to avoid unnecessarily overloading the base station).

The above-mentioned dynamic map may also be provided to the terminals via downlink signalling or any other means so that a terminal will have more granular information regarding where it is expected to use Uu interface (with the base station) in addition to PC5 interface (with other terminals). This way, the terminals do not need to be commanded one by one by the base station to adjust the communications link. More generally, the base station may request a terminal to use the Uu interface anywhere within a cell that it is handing over to if there are areas suffering from shadowing in that cell. The terminal may then use either the Uu or the PC5 interface for D2D traffic depending on the information it has received from the base station regarding shadowing in the cell.

While in some of the specific examples discussed above the sidelink discovery information reporting can be terminal-led, in other examples the process may be initiated by the network and for example by the base station serving one or more V2X-enabled terminals. For example, the base station can request a sidelink discovery report from one or more terminals and, based on the sidelink discovery report(s) received, it can determine whether one or more terminals (which could be the same, partially the same or different from the one or more terminals reporting sidelink discovery information) are believed to be experiencing shadowing or obstruction and whether their sidelink traffic should be re-routed via the base station with a view to reducing the expected impact of shadowing.

Figure 9:
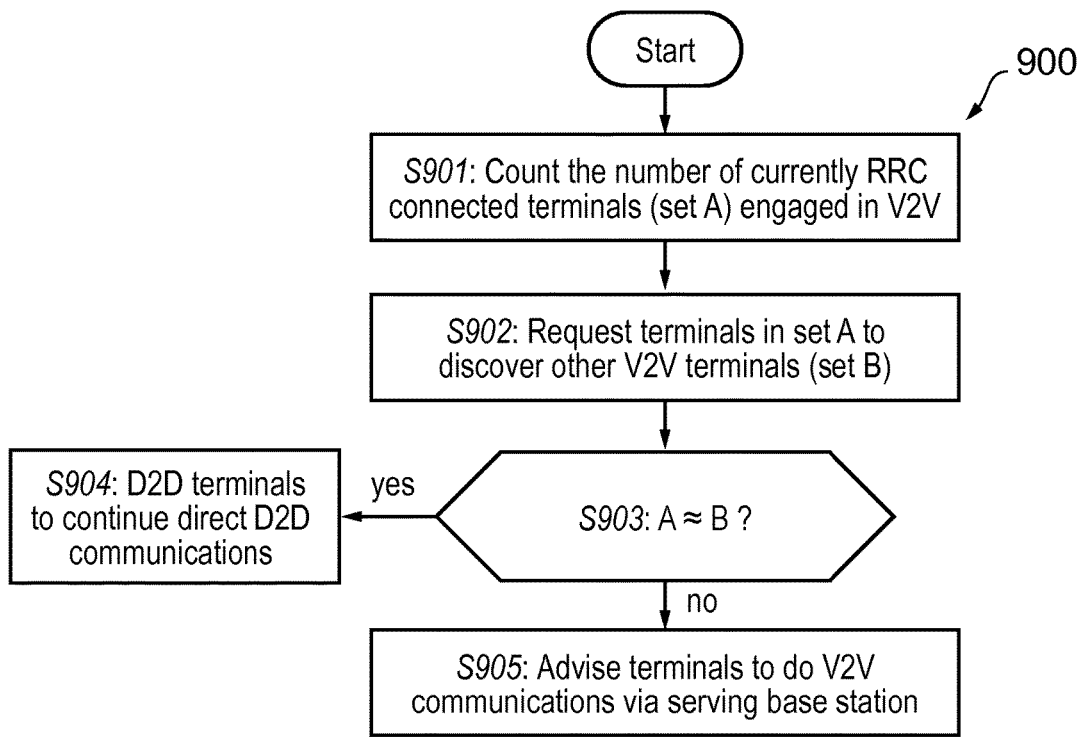
FIG. 9 illustrates a further example method for shadowing detection.

FIG. 9 illustrates a further example method for shadowing detection. Once the method 900 starts, the base station starts counting or identifying the terminals which are currently RRC connected and engaged in a V2V-scheme and/or V2V-enabled at S901. These terminals will be referred to as set A. The serving base station has knowledge of how many V2V-enabled (or V2X-enabled) terminals are currently RRC connected in any cell, which is the total search space of potentially discoverable devices. Then at S902, the base station requests the terminals in set A to discover other V2V terminals (set B). Once the terminals report how many other D2D discovery signals they measured and optionally, their location, this constitutes the outcome of the discovery process. At S903, set A and B are compared to detect any discrepancy or significant discrepancy between the two. In one example, set B can correspond to a discovery report from a single terminal and the number of terminals in set A can be compared with the number of terminals in set B for this terminal, and this comparison can be carried out for each terminal in set A. In another example, set A and can be compared with set B (based on all the discovery reports from the terminals of set A) on the basis of a comparison of the respective number of terminals in the sets, on the basis of a comparison of the terminals identified in each sets, or on the basis of any other suitable type of comparison. In one example, the network equipment (e.g. the base station) determines whether there is a remarkable disparity between the sizes of the total search space (set A) and the outcome of the discovery process (Set B). In another example, for each terminal in set B, it is counted the number of times it has been detected by the other terminals in set A and based on the number of detections (and possible any additional suitable information, such the location of one or more of the terminals), it can be estimated whether this number of detections is below what would be expected for this terminal and this information can be used for determining the likelihood of this terminal being in the shadow of an obstacle. Regardless of the comparison method, should the disparity between the two sets be large ("no" at S903), it can be established that there is a relatively high likelihood that an obstacle that is interfering with D2D radio communications in the cell. Similarly to the terminal-initiated process discussed above, if there is obstruction D2D traffic can then be re-routed from the direct sidelink to the uplink/downlink via the base station. V2X-enabled terminals can thus be instructed to engage the serving base station in their communication to at least some other V2X-enabled UEs (S905). In some cases it can be estimated which terminals would benefit or would benefit most from a re-routing of D2D traffic from sidelink to the uplink and downlink via the base station and only these terminals may be instructed to re-route their traffic. Other terminals, for example terminals travelling along the same road, may not be instructed to re-route D2D traffic via the base station or, if appropriate, can be instructed to stop re-routing and to use the direct sidelink for V2X communications. In some cases a terminal may be configured to re-route D2D traffic for a first further V2X terminal (e.g. hidden by an obstacle) via the base station and to use the sidelink for D2D traffic for a second further V2X terminal (e.g. with direct line-of-sight conditions). On the other hand, if the comparison of set A and Set B at S903 does not detect a likely obstruction, then the relevant V2X-enabled terminals can route their D2D traffic via the direct sidelink to any other relevant V2X-enabled terminals (S904), as would normally be expected.

Accordingly, a network device, which may for example be a part of the base station and/or of any other network element, can estimate whether one or more terminals are likely or believed to be experiencing shadowing and can therefore take steps for the relevant D2D traffic to be re-routed via the base station with a view to reducing the effect of shadowing on V2X communications.

Figure 10:
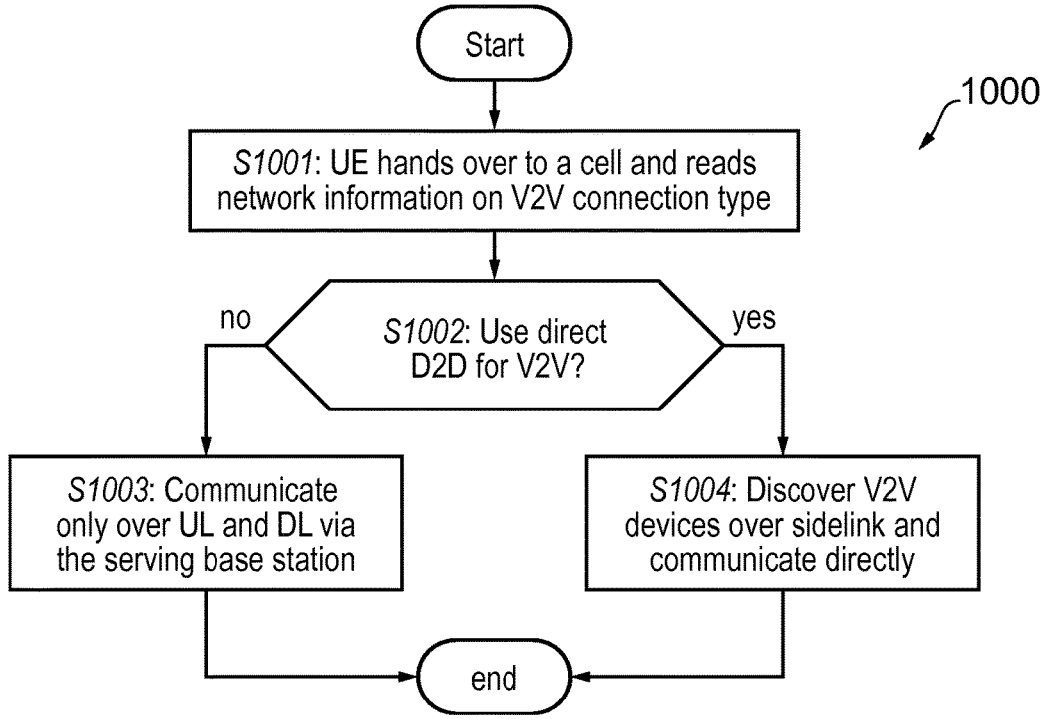
FIG. 10 illustrates an example method for cell-wide shadowing avoidance.

In one example, if it is established that, in a cell, it is difficult to discover terminals via direct D2D links, terminals joining the cell can be advised or instructed to always communicate via the serving base station through uplink and downlink and not to use the sidelinks due to the number of obstacles in the area. FIG. 10 illustrates an example method for cell-wide shadowing avoidance. The method 1000 starts and at S1001, a terminal hands over to a cell or joins the cell for any other reasons (e.g. after a restart) and reads information provided by the network regarding the V2X connection type or mode. For example, the terminal may obtain this information from system information provided by the base station for the cell. At S1002, the terminal determines whether it is to use the sidelink directly or the base station to route D2D traffic. If, based on the network information, the terminal determines that it is to use the sidelink ("yes" at S1002), it moves to S1004 where it discovers V2V terminals over the sidelink and communicate with them directly via the sidelink as well, as would conventionally be expected. If however the terminal determines at S1002 that it should not use the sidelink for D2D traffic because of probably obstructions, the terminal then communicate via the uplink/downlink only for everything, including for D2D traffic (S1003). The method can then end. In some examples the terminal will carry on using the same communication routes for as long as it is in the cell (as a V2V terminal, it is unlikely to remain in the cell for an extended period of time so it may be considered unnecessary to update the routing configuration). In other examples, the terminal may listen for any configuration changes, for example by listening for further network information for the cell, to determine whether it has to change routing configuration, for instance between S1003 and S1004, due to a change in the estimated likelihood of the experiencing shadowing in the cell.

According to the present disclosure, the robustness in V2V communications (e.g. in an LTE network environment) can be promoted through a selection of either direct D2D (sidelink) connections or a connection routed via the serving base station (uplink-downlink) depending on an estimated level of obstructions which itself is based on sidelink discovery information, and in particular on sidelink discovery information which may be for V2X-enabled terminals only. Where no obstruction is expected to hamper direct connectivity between terminals, full use of sidelink resources can be made and the legacy uplink-downlink resources remain available for other communications. Where obstructions are expected to hamper direct D2D connectivity, rather than lose reliability from D2D connectivity, V2V communications can be carried out via the base station.

In the examples given in the present disclosure the terminals have been in many cases described as V2V and/or D2D terminals. As the skilled person will understand, the teachings of the present disclosure are applicable for any V2X-enabled terminals, that is, for any terminals that have vehicle- or transportation-related functionalities activated and which are configured to set up a direct (sidelink) communication with another V2X terminal. For example, in some cases a V2X-enabled terminal may be a V2I-enabled terminal which is configured to communicate with another V2I-enabled terminal (e.g. a RSU) using a device-to-device technology which is different to the currently available D2D technology as defined in the 3GPP consortium. In other cases, terminals may be configured to operate according to a 4G (e.g. LTE) or 5G standard for both uplink and downlink communications and according to a D2D (e.g. as part of a 4G, 5G or different communication standard) for sidelink communications.

Also, when reference is made to a V2X-enabled terminal, it is to be understood as a terminal with V2X capabilities and, optionally, as a V2X terminal with activated V2X-functionalities. In some examples, a terminal which is configured to be used in a V2X environment but which is not currently used in that environment may not be considered as a V2X-enabled terminal in some of the examples above. For example the terminal may be configured to be used in association with a vehicle but may be currently used outside the vehicle as a conventional telephone such that it will not operate its sidelink functionalities and, as an illustration, it will not transmit or respond to D2DN2X discovery messages from other terminals when the V2X-functionalities are not enabled on the terminal.

It is noteworthy that, in the present disclosure, when mention is made of device-to-device traffic or sidelink traffic, this is intended to refer traffic to be sent to another terminal via a sidelink (and when obstructions are detected or estimated, this can be transmitted to the base station instead). For example, D2D traffic can include any one or more of user data, control signalling, discovery signalling and any other type of traffic that would otherwise be transmitted directly between the terminals according to the device-to-device protocol they are using. Therefore, D2D or sidelink traffic is normally sent via the sidelink (the direct device-to-device link between terminals) and, in accordance with the present disclosure, when an obstruction is detected (or estimated), then this traffic is routed via the base station instead.

Additionally, teachings provided herein in respect of one aspect (e.g. the general scheme, the operating of a terminal according to the scheme, etc.) is equally applicable to the other aspects.

It will be appreciated that while some of the above-described embodiments have focused on examples in which a base station of the wireless telecommunications system is providing functionality in accordance with the principles described herein, in other implementations similar functionality may be provided by other components of the wireless telecommunications network infrastructure. For example, some, or all, of the processing described above in relation to the base station may be provided by a core network component of the wireless telecommunications system and/or similar functionality may be provided by other infrastructure elements, such as relay nodes and/or dedicated units for supporting an ITS scheme, for example roadside units (RSUs) deployed in association with a road network to facilitate vehicle-to-vehicle communications in accordance with previously proposed schemes. In this regard a base station may be considered as one example of network infrastructure equipment and maybe configured to provide functionality of the kind described herein.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered clauses:

Clause 1. A method of routing communication in a mobile communications system, the mobile communications system comprising a base station configured to communicate with mobile communications devices via a wireless interface, wherein a first of the mobile communications devices is operable to communicate via the wireless interface by routing downlink and/or uplink traffic to the base station and by routing device-to-device traffic directly via a sidelink to at least one other of the mobile communications devices, wherein the method comprises:

estimating, using sidelink discovery reporting information from a second mobile communications device, that the sidelink between the first and second mobile communications devices is experiencing shadowing caused by one or more obstacles;

upon estimating that the sidelink between the first and second mobile communications devices is experiencing shadowing, instructing the first and second mobile communications devices to communicate via the base station for at least part of the device-to-device traffic for the first mobile communications device.

Clause 2. The method of clause 1 wherein the at least part of the device-to-device traffic for the first mobile communications device comprises the device-to-device traffic for the first mobile communications device between the first and second mobile communications devices.

Clause 3. The method of any preceding clause, wherein the method comprises the first mobile communications device, upon receipt of instructions to communicate via the base station for at least part of device-to-device traffic for the first mobile communications device, routing device-to-device traffic for the second mobile communications devices via the base station.

Clause 4. The method of any preceding clause wherein the method comprises the second mobile communications device, upon receipt of instructions to communicate via the base station for at least part of the device-to-device traffic for the first mobile communications device, routing device-to-device traffic for the first mobile communications devices via the base station.

Clause 5. The method of any preceding clause wherein the estimating is further based on sidelink discovery reporting information from the first mobile communications device.

Clause 6. The method of any preceding clause wherein the estimating that the sidelink between the first and second mobile communications devices is experiencing shadowing caused by one or more obstacles comprises:

estimating, using sidelink discovery reporting information from one or more mobile communications devices, that the sidelink between the first and the second mobile communication devices is affected by slow fading resulting in a poor quality or non-existent sidelink between the first and second mobile communications devices ; and determining, based on the distance between the first and second mobile communications devices, that the poor quality or non-existent sidelink is not caused by free-space path loss.

Clause 7. The method of any preceding clause further comprising: identifying, based on the estimating that the sidelink between the first and second mobile communications devices is experiencing shadowing caused by one or more obstacles, an area affected by shadowing.

Clause 8. The method of clause 7, the method comprising:

a third mobile communications device connecting to the base station via the wireless interface;

upon the third mobile communications device connecting with the base station, and in the event that the third mobile communications device is in the identified area, instructing the third mobile communications device to communicate via the base station for at least part of device-to-device traffic for the third mobile communications device.

Clause 9. The method of any preceding clause wherein, upon estimating that the sidelink between the first and second mobile communications devices is no longer experiencing shadowing, instructing the first mobile communications device to communicate via the sidelink for the at least part of the device-to-device traffic for the first mobile communications device.

Clause 10. The method of any preceding clause, wherein the estimating that the sidelink between the first and second mobile communications devices is experiencing shadowing caused by one or more obstacles comprises:

the first mobile communications device determining the presence of a communication area in the vicinity of the first mobile communications device where other mobile communications devices may be located;

upon determination of the presence of a communication area in the vicinity of the first mobile communications device, the first mobile communications device performing a sidelink discovery process for discovering further mobile communications devices;

upon detection that the number of discovered further mobile communications devices is under a discovery threshold, the first mobile communications device reporting to the base station an indication of the discovered further mobile communications devices.

Clause 11. The method of clause 10 wherein the communication area comprises an area with one or more of: a travelling path intersection, a travelling path bifurcation and a turn in the travelling path.

Clause 12. The method of clause 10 or 11 wherein the indication of the discovered further mobile communications devices comprises one or more of: a number of discovered further mobile communications devices and an identifier of one or more of the discovered further mobile communications devices.

Clause 13. The method of any of clauses 10 to 12 wherein the sidelink discovery process for discovering further mobile communications devices is for discovering mobile communications devices with a vehicle-related functionality and, optionally, for discovering mobile communications devices with a Vehicle-to-Everything "V2X" or Vehicle-to-Vehicle "V2V" functionality.

Clause 14. The method of any of clauses 10 to 13, wherein the first mobile communications device comprises an antenna having directional capabilities and wherein the method further comprises, upon determination of the presence of a communication area in the vicinity of the first mobile communications device, the first mobile communications device steering the antenna towards the communication area.

Clause 15. The method of any of clauses 10 to 13 wherein the first mobile communications device determining the presence of a communication area in the vicinity of the first mobile communications device comprises the first mobile communications device determining the presence of a communication area in the vicinity of the first mobile communications device and in a direction of travel of the first mobile communications device.

Clause 16. The method of any of clauses 10 to 15 further comprising the first mobile communications device receiving the discovery threshold from the base station.

Clause 17. The method of clause 16 further comprising the base station setting the discovery threshold based on a number of mobile communications devices that are being served by the base station.

Clause 18. The method of any of clauses 10 to 16 wherein the discovery threshold is an integer number of at least one.

Clause 19. The method of any preceding clause wherein the estimating that the sidelink between the first and second mobile communications devices is experiencing shadowing caused by one or more obstacles comprises:

the base station identifying a set of mobile communications devices with a vehicle-related functionality and served by the base station;

the first mobile communications device performing a sidelink discovery process for discovering further mobile communications devices and reporting to the base station an indication of the discovered further mobile communications devices;

upon comparison of the received indication of discovered further mobile communications devices and of the identified set of mobile communications devices, estimating that the sidelink between the first and second mobile communications devices is experiencing shadowing caused by one or more obstacles.

Clause 20. The method of clause 19, wherein the indication of the discovered further mobile communications devices comprises a number of the discovered further mobile communications devices; and the comparison of the received indication of discovered further mobile communications devices and of the identified set of mobile communications devices comprises a comparison of the number of discovered further mobile communications devices in the indication with the number of mobile communications devices in the set of mobile communications devices.

Clause 21. The method of clause 19 or 20, further comprising:

the base station instructing each mobile communications device of the set of mobile communications devices to perform a sidelink discovery process for discovering further mobile communications devices and to report to the base station an indication of the discovered further mobile communications devices;

the base station receiving one or more discovery reports from the set of mobile communications devices, the one or more discovery reports comprising one or more indications of the discovered further mobile communications devices;

upon comparison of the received one or more indications of discovered further mobile communications devices and of the identified set of mobile communications devices, estimating that the set of sidelinks between mobile communications devices is experiencing shadowing caused by one or more obstacles.

Clause 22. The method of clause 21, wherein the first mobile communications device is part of the set of mobile communications devices.

Clause 23. The method of clause 21 or 22, wherein the one or more indications of the discovered further mobile communications devices comprises a number of the discovered further mobile communications devices; and the comparison of the received one or more indications of discovered further mobile communications devices and of the identified set of mobile communications devices comprises, for each indication of the one or more indications, comparing the number of discovered further mobile communications devices in the each indication with the number of mobile communications devices in the set of mobile communications devices.

Clause 24. A method of operating a mobile communications device in a mobile communications system, the mobile communications system comprising a base station configured to communicate with the mobile communications device via a wireless interface, wherein the mobile communications device is operable to communicate via the wireless interface by routing downlink and/or uplink traffic to the base station and by routing device-to-device traffic directly via a sidelink to at least one other of the mobile communications devices, wherein the method comprises the mobile communications device:

performing a sidelink discovery process for discovering one or more mobile communications devices with activated transportation-related functionalities;

upon detection that the number of discovered mobile communications devices is under an expected number, transmitting sidelink discovery reporting information based on the sidelink discovery process performed;

upon receipt of re-routing instructions from the base station, routing at least part of device-to-device traffic via the base station.

Clause 25. The method of clause 24, wherein the method further comprises the mobile communications device:

determining the presence of a communication area in the vicinity of the mobile communications device where other mobile communications devices may be located;

upon determination of the presence of a communication area in the vicinity of the mobile communications device, performing a sidelink discovery process for discovering further mobile communications devices;

upon detection that the number of discovered further communications devices is under a discovery threshold, the mobile communications device reporting to the base station an indication of the discovered further mobile communications devices.

Clause 26. A mobile communications device in a mobile communications system, the mobile communications system comprising a base station configured to communicate with the mobile communications device via a wireless interface, wherein the mobile communications device comprises a transmitter, receiver and controller configured to operate together to communicate via the wireless interface by routing downlink and/or uplink traffic to the base station and by routing device-to-device traffic directly via a sidelink to at least one other of the mobile communications devices, wherein the transmitter, receiver and controller are further configured to operate together to:

perform a sidelink discovery process for discovering one or more mobile communications devices with activated transportation-related functionalities;

upon detection that the number of discovered mobile communications devices is under an expected number, transmit sidelink discovery reporting information based on the sidelink discovery process performed;

upon receipt of re-routing instructions from the base station, route at least part of device-to-device traffic via the base station.

Clause 27. Integrated circuitry for a mobile communications device in a mobile communications system, the mobile communications system comprising a base station configured to communicate with the mobile communications device via a wireless interface, wherein the mobile communications device comprises a transmitter, receiver and controller configured to operate together to communicate via the wireless interface by routing downlink and/or uplink traffic to the base station and by routing device-to-device traffic directly via a sidelink to at least one other of the mobile communications devices, wherein the integrated circuitry comprises a controller element and a transceiver element configured to operate together to:

perform a sidelink discovery process for discovering one or more mobile communications devices with activated transportation-related functionalities;

upon detection that the number of discovered mobile communications devices is under an expected number, transmit sidelink discovery reporting information based on the sidelink discovery process performed;

upon receipt of re-routing instructions from the base station, route at least part of device-to-device traffic via the base station.

Clause 28. A method of operating a network device in a mobile communications system, the mobile communications system comprising a base station configured to communicate with mobile communications devices via a wireless interface, wherein a first of the mobile communications devices is operable to communicate via the wireless interface by routing downlink and/or uplink traffic to the base station and by routing device-to-device traffic directly via a sidelink to at least one other of the mobile communications devices, wherein the method comprises the network device:

estimating, using sidelink discovery reporting information from one or more mobile communications devices, that the sidelink between the first and second mobile communications devices is experiencing shadowing caused by one or more obstacles;

upon estimating that the sidelink between the first and second mobile communications devices is experiencing shadowing, instructing the first mobile communications device to communicate via the base station for at least part of device-to-device traffic.

Clause 29. A network device in a mobile communications system, the mobile communications system comprising a base station configured to communicate with mobile communications devices via a wireless interface, wherein a first of the mobile communications devices is operable to communicate via the wireless interface by routing downlink and/or uplink traffic to the base station and by routing device-to-device traffic directly via sidelink to at least one other of the mobile communications devices, wherein the network device is configured to:

estimate, using sidelink discovery reporting information from one or more mobile communications devices, that the sidelink between the first and second mobile communications devices is experiencing shadowing caused by one or more obstacles;

upon estimating that the sidelink between the first and second mobile communications devices is experiencing shadowing, instruct the first mobile communications device to communicate via the base station for at least part of device-to-device traffic.

Clause 30. The network device of clause 29, wherein the network device is part of at least one of: a base station, a road-side unit, a relay node and any other piece of network equipment.

Clause 31. Integrated circuitry for network device in a mobile communications system, the mobile communications system comprising a base station configured to communicate with mobile communications devices via a wireless interface, wherein a first of the mobile communications devices is operable to communicate via the wireless interface by routing downlink and/or uplink traffic to the base station and by routing device-to-device traffic directly via sidelink to at least one other of the mobile communications devices, wherein the integrated circuitry comprises a controller element and, optionally, a transceiver element configured to operate together to:

estimate, using sidelink discovery reporting information from one or more mobile communications devices, that the sidelink between the first and second mobile communications devices is experiencing shadowing caused by one or more obstacles;

upon estimating that the sidelink between the first and second mobile communications devices is experiencing shadowing, instruct the first mobile communications device to communicate via the base station for at least part of device-to-device traffic.

Clause 32. Computer software which, when executed by a computer, causes the computer to perform the method of clause 1, 24 or 28.

Clause 33. A storage medium which stores computer software according to clause 32.

Clause 34. Any preceding clause wherein the base station and the mobile communications devices are operable to communicate via the wireless interface using at least one of: a 3GPP communication protocol, an LTE communication protocol, a 4G communication protocol and a 5G communication protocol.

Clause 35. A method of routing communication in a mobile communications system, a method of operating a mobile communications device in a mobile communications system, a mobile communications device in a mobile communications system, integrated circuitry for a mobile communications device in a mobile communications system, a method of operating a network device in a mobile communications system, a network device in a mobile communications system, integrated circuitry for network device in a mobile communications system, Computer software and/or a storage medium which stores computer software substantially as hereinbefore described with reference to the accompanying drawings.

REFERENCES

[1] Holma H. and Toskala A., "LTE for UMTS OFDMA and SC-FDMA based radio access", John Wiley and Sons, 2009
[2] WO 2014/198325
[3] US 2012/0150386

The invention claimed is:

1. A method of routing communication in a mobile communications system, the mobile communications system comprising a base station configured to communicate with mobile communications devices via a wireless interface, wherein a first of the mobile communications devices is operable to communicate via the wireless interface by routing downlink and/or uplink traffic to the base station and by routing device-to-device traffic directly via a sidelink to at least one other of the mobile communications devices, wherein the method performed by the base station comprises:
   estimating, using sidelink discovery reporting information from a second mobile communications device, that the sidelink between the first and second mobile communications devices is experiencing shadowing caused by one or more obstacles;
   identifying, based on the estimating that the sidelink between the first and second mobile communications devices is experiencing shadowing caused by one or more obstacles, an area affected by shadowing; and
   upon estimating that the sidelink between the first and second mobile communications devices is experiencing shadowing, instructing the first and second mobile communications devices to communicate via the base station for at least part of the device-to-device traffic for the first mobile communications device.

2. The method of claim 1 wherein the at least pan of the device-to-device traffic for the first mobile communications device comprises the device-to-device traffic for the first mobile communications device between the first and second mobile communications devices.

3. The method of claim 1, wherein the method comprises the first mobile communications device, upon receipt of instructions to communicate via the base station for at least part of device-to-device traffic for the first mobile communications device, routing device-to-device traffic for the second mobile communications devices via the base station.

4. The method of claim 1 wherein the method comprises the second mobile communications device, upon receipt of instructions to communicate via the base station for at least part of the device-to-device traffic for the first mobile communications device, routing device-to-device traffic for the first mobile communications devices via the base station.

5. The method of claim 1 wherein the estimating is further based on sidelink discovery reporting information from the first mobile communications device.

6. The method of claim 1 wherein the estimating that the sidelink between the first and second mobile communications devices is experiencing shadowing caused by one or more obstacles comprises:
   estimating, using sidelink discovery reporting information from one or more mobile communications devices, that the sidelink between the first and the second mobile communication devices is affected by slow fading resulting in a poor quality or non-existent sidelink between the first and second mobile communications devices; and
   determining, based on the distance between the first and second mobile communications devices, that the poor quality or non-existent sidelink is not caused by free-space path loss.

7. The method of claim 1, the method comprising:
   a third mobile communications device connecting to the base station via the wireless interface; and
   upon the third mobile communications device connecting with the base station, and in the event that the third mobile communications device is in the identified area, instructing the third mobile communications device to communicate via the base station for at least part of device-to-device traffic for the third mobile communications device.

8. The method of claim 1 wherein, upon estimating that the sidelink between the first and second mobile communications devices is no longer experiencing shadowing, instructing the first mobile communications device to communicate via the sidelink for the at least part of the device-to-device traffic for the first mobile communications device.

9. The method of claim 1, wherein the estimating that the sidelink between the first and second mobile communications devices is experiencing shadowing caused by one or more obstacles comprises:
   the first mobile communications device determining the presence of a communication area in the vicinity of the first mobile communications device where other mobile communications devices may be located;
   upon determination of the presence of a communication area in the vicinity of the first mobile communications device, the first mobile communications device performing a sidelink discovery process for discovering further mobile communications devices: and
   upon detection that the number of discovered further mobile communications devices is under a discovery threshold, the first mobile communications device reporting to the base station an indication of the discovered further mobile communications devices.

10. The method of claim 9 wherein the communication area comprises an area with one or more of a travelling path intersection, a travelling path bifurcation and a turn in the travelling path.

11. The method of claim 9 wherein the indication of the discovered further mobile communications devices comprises one or more of: a number of discovered further mobile communications devices and an identifier of one or more of the discovered further mobile communications devices.

12. The method of claim 9, wherein the sidelink discovery process for discovering further mobile communications devices is for discovering mobile communications devices with a vehicle-related functionality and, optionally, for discovering mobile communications devices with a Vehicle-to-Everything "V2X" or Vehicle-to-Vehicle "V2V" functionality.

13. The method of claim 9, wherein the first mobile communications device comprises an antenna having directional capabilities and wherein the method further comprises, upon determination of the presence of a communication area in the vicinity of the first mobile communications device, the first mobile communications device steering the antenna towards the communication area.

14. The method of claim 9, wherein the first mobile communications device determining the presence of a communication area in the vicinity of the first mobile communications device comprises the first mobile communications device determining the presence of a communication area in the vicinity of the first mobile communications device and in a direction of travel of the first mobile communications device.

15. The method of claim 9 further comprising the first mobile communications device receiving the discovery threshold from the base station.

16. The method of claim 15 further comprising the base station setting the discovery threshold based on a number of mobile communications devices that are being served by the base station.

17. The method of claim 9, wherein the discovery threshold is an integer number of at least one.

* * * * *